UNITED STATES PATENT OFFICE.

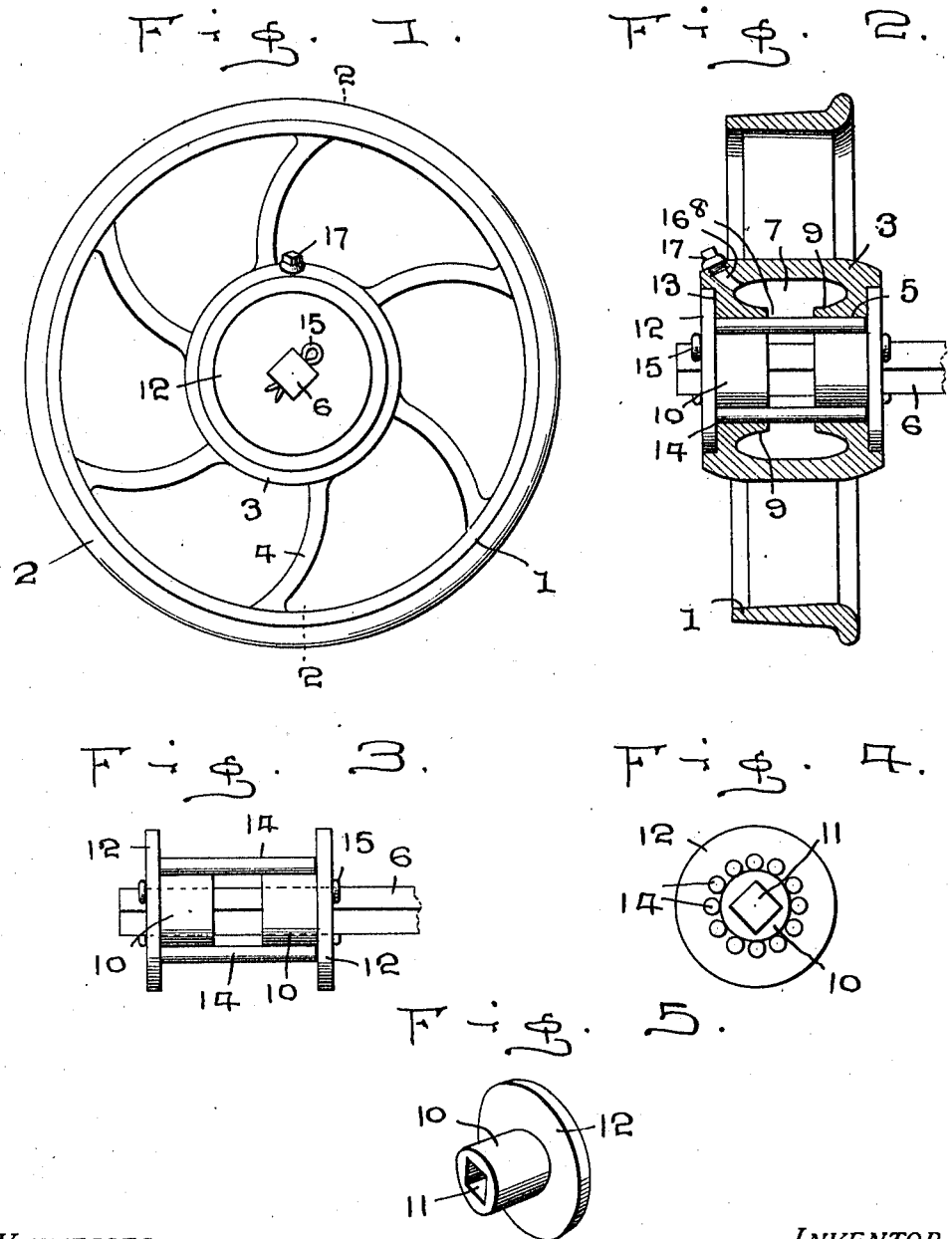

WILLIAM H. GREEN, OF COLORADO SPRINGS, COLORADO.

WHEEL CONSTRUCTION.

1,004,417.  Specification of Letters Patent.  Patented Sept. 26, 1911.

Application filed January 7, 1910. Serial No. 536,822.

*To all whom it may concern:*

Be it known that I, WILLIAM H. GREEN, a citizen of the United States, residing at Colorado Springs, in the county of El Paso and State of Colorado, have invented certain new and useful Improvements in Wheel Construction; and I do hereby declare the following to be a full, clear, and exact description of the invention, such as will enable others skilled in the art to which it appertains to make and use the same.

My invention relates to new and useful improvements in wheel construction and more particularly to that class adapted to be used for supporting a car and my object is to provide a hub for the wheel having an oil chamber therein.

A further object is to provide means for conveying the oil to the wearing parts of the wheel.

A still further object is to provide interchangeable bearing parts for the wheel and a still further object is to provide roller bearings for the wheel.

Other objects and advantages will be hereinafter referred to and more particularly pointed out in the claim.

In the accompanying drawings forming part of this application, Figure 1 is an elevation of a wheel mounted upon an axle. Fig. 2 is a sectional view as seen on line 2—2, Fig. 1. Fig. 3 is a detail elevation of the interchangeable wearing parts for the wheel. Fig. 4 is an end elevation of one of the bearing parts showing the rollers in position therearound, and, Fig. 5 is a detail perspective view of one of the bearing parts removed from the wheel.

Referring to the drawings in which similar reference numerals designate corresponding parts throughout the several views, 1 indicates the wheel proper, which is provided with the usual form of tread 2 and a hub 3, said hub being secured to the tread by means of spokes 4.

The hub 3 is provided with a longitudinal bore 5, through which is adapted to extend an axle 6, the axle being stationary and having that portion extending through the hub, square in cross section. The hub 3 is provided with a circumferential cavity 7, which cavity communicates with the bore 5 through a slot 8, the cavity being employed to hold oil for lubricating the bearing parts of the wheel and by forming the ends of the cavity substantially oval, inclined faces 9 are formed whereby the lubricant will be fed by gravity through the slot 8.

As the axle 6 is square, I provide bearings or bushings 10, said bearings having square openings 11 therethrough which fit the contour of the axle, while the outer surfaces of the bearing are rounded, there being two of the bearings for each hub, which are extended into the bore 5 from opposite ends of the hub, the opposed ends of the bearings extending into alinement with the walls of the slot 8.

The outer ends of the bearings 10 are provided with circular flanges 12, which flanges are seated in circular recesses 13 formed in the ends of the hub, said flanges limiting the inward movement of the bearings and at the same time forming seals for the ends of the bore 5, thus preventing undue leakage of the lubricant from the ends of the bore. The bearings may engage the walls of the bore direct, if desired, but, if preferred, the bore may be made larger than the diameter of the bearings and a plurality of rollers 14 placed around the bearings and introduced into the bore, thereby materially reducing the friction between the wheel and bearings.

After the bearings have been properly assembled in the hub of the wheel and the square end of the axle introduced through the opening 11, any suitable means may be employed for holding the bearings in the hub and at the same time holding the wheel in position on the axle, but in this instance, I have provided cotter pins 15, which are entered through the axle 6 in the usual manner and by placing a pin at each end of the hub, the wheel will be held against movement longitudinally of the axle.

The oil is introduced into the cavity 7 by providing a port 16, which extends from the cavity to the outer face of the hub 3 and has its upper end threaded to receive a plug 17, said plug being adapted to prevent the oil from leaving the cavity and at the same time prevent dust, etc., from passing into the cavity.

In placing the lubricant in the cavity, the plug 17 is removed and a sufficient quantity of the lubricant placed therein to fill the lower portion of the cavity to a point on a level with the lowermost portion of the bearings 10 and it will be readily seen that when the wheel is rotated, a quantity of the lubricant will adhere to the walls of the cavity and in view of the inclined faces 9, will readily descend and be deposited on the bearings in small quantities, thereby keeping the bearings thoroughly lubricated and at the same time prevent an excess of lubricant from being deposited on the bearings, which would result in causing the unused lubricant to leave the hub at the ends thereof.

It will thus be seen that I have provided a durable wearing surface for the hub of a wheel and one that can be renewed when desired and as the major portion of the wear is always at a point below the axle and as the bearings are held in a fixed position on the axle, should said bearings become worn at one point, they can be removed and given a quarter turn thereby bringing a new part of the bearing in position to receive the major portion of the wear and this operation can be repeated until the bearing is completely destroyed.

It will further be seen that I have provided convenient means for lubricating the wearing portions of the wheel and one wherein the lubricant will be fed onto the bearings slowly and it will likewise be seen that the wheel itself and bearing parts may be quickly removed or secured in position on the axle.

What I claim is:

In a wheel construction, the combination with a hub bearing having an annular lubricant reservoir therein communicating with the bearing chamber through an annular slot, said reservoir having the ends thereof oval in shape to form inclined faces leading to said slot; of an axle extending through the bearing, a pair of bearing bushings carried on the axle, flanged outside ends on said bushings adapted to fit the counterbores of the bearing, the inner ends of said bushings being formed in alinement with the ends of said annular slot leading to said reservoir, and a single series of bearing rollers positioned in the annular chamber formed between the bushings and the hub, whereby portions of said rollers will be continuously exposed to the lubricant flowing from the reservoir through the annular slot and any escape of lubricant will be utilized in lubricating the thrust bearings formed by the flanges of the bushings and the counterbores of the hub.

In testimony whereof I have signed by name to this specification in the presence of two subscribing witnesses.

WILLIAM H. GREEN.

Witnesses:
F. A. SCHECK,
W. E. GREEN.

---

Copies of this patent may be obtained for five cents each, by addressing the "Commissioner of Patents, Washington, D. C."